United States Patent
Yue

(10) Patent No.: US 9,991,838 B2
(45) Date of Patent: Jun. 5, 2018

(54) DRIVE CONTROL UNIT FOR MOTOR

(71) Applicant: Hitachi Automotive Systems, Ltd., Ibaraki (JP)

(72) Inventor: Xiaofei Yue, Gunma (JP)

(73) Assignee: Hitachi Automotive System, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/557,289

(22) PCT Filed: Feb. 25, 2016

(86) PCT No.: PCT/JP2016/055586
§ 371 (c)(1),
(2) Date: Sep. 11, 2017

(87) PCT Pub. No.: WO2016/143534
PCT Pub. Date: Sep. 15, 2016

(65) Prior Publication Data
US 2018/0062556 A1  Mar. 1, 2018

(30) Foreign Application Priority Data
Mar. 12, 2015 (JP) .................. 2015-049661

(51) Int. Cl.
*H02P 27/04* (2016.01)
*H02P 27/06* (2006.01)
(Continued)

(52) U.S. Cl.
CPC ............ *H02P 27/06* (2013.01); *B62D 5/0406* (2013.01); *B62D 5/0463* (2013.01);
(Continued)

(58) Field of Classification Search
CPC ...... H02P 1/00; H02P 3/00; H02P 6/00; H02P 21/00; H02P 23/00; H02P 27/04; H02P 27/06; H02P 41/00
(Continued)

(56) References Cited

U.S. PATENT DOCUMENTS

| 8,456,049 B2* | 6/2013 | Matsuda | ............. B62D 5/0406 |
| | | | 180/444 |
| 9,088,195 B2* | 7/2015 | Yamasaki | ............ B62D 5/0406 |

(Continued)

FOREIGN PATENT DOCUMENTS

| JP | 2011-176998 A | 9/2011 |
| JP | 2013-86718 A | 5/2013 |

(Continued)

OTHER PUBLICATIONS

International Search Report (PCT/ISA/210) issued in PCT Application No. PCT/JP2016/055586 dated May 24, 2016 with English-language translation (four (4) pages).

(Continued)

*Primary Examiner* — Antony M Paul
(74) *Attorney, Agent, or Firm* — Crowell & Moring LLP

(57) ABSTRACT

A drive control unit in which a drive control system for a motor is made redundant so that a motor having two coil sets is individually driven and controlled for each coil set includes an inverter substrate on which a first inverter circuit that drives each coil of a first coil set, and a second inverter circuit that drives each coil of a second coil set are formed; a control substrate on which a first control circuit that includes a microcomputer which controls the first inverter circuit, and a second control circuit that includes a microcomputer which controls the second inverter circuit are formed; and a housing in which the inverter substrate and the control substrate are arranged in parallel to each other. The (Continued)

first control circuit is positioned on the front surface side, and the second control circuit is positioned on the rear surface side of the control substrate.

12 Claims, 8 Drawing Sheets

(51) Int. Cl.
  *H02M 7/44* (2006.01)
  *B62D 5/04* (2006.01)
  *H02P 5/00* (2016.01)

(52) U.S. Cl.
  CPC ............ *B62D 5/0475* (2013.01); *H02M 7/44* (2013.01); *H02P 5/00* (2013.01)

(58) Field of Classification Search
  USPC ............ 318/400.01, 400.02, 400.14, 400.15, 318/400.32, 727, 779, 799, 800, 801, 494, 318/501, 266, 466, 432, 700, 701; 363/21.1, 40, 44, 95, 120, 174, 175; 388/800, 819, 821; 74/388 PS
  See application file for complete search history.

(56) References Cited

U.S. PATENT DOCUMENTS

| | | | |
|---|---|---|---|
| 9,444,310 B2 * | 9/2016 | Tsuboi | .................. H02K 11/33 |
| 2012/0098361 A1 | 4/2012 | Yamasaki et al. | |
| 2012/0098391 A1 * | 4/2012 | Yamasaki | ............ B62D 5/0406 310/68 D |
| 2014/0116798 A1 | 5/2014 | Nagase et al. | |
| 2015/0155816 A1 | 6/2015 | Saito et al. | |

FOREIGN PATENT DOCUMENTS

| | | |
|---|---|---|
| JP | 2014-90030 A | 5/2014 |
| WO | WO 2014/010061 A1 | 1/2014 |

OTHER PUBLICATIONS

Japanese-language Written Opinion (PCT/ISA/237) issued in PCT/JP2016/055586 dated May 24, 2016 dated May 17, 2016 with unverified English translation (six (6) pages).
International Preliminary Report on Patentability (PCT/IB/338 & PCT/IB/373) issued in PCT Application No. PCT/JP2016/055586 dated Sep. 21, 2017, including English translation of document C2 (Japanese-language Written Opinion (PCT/ISA/237)) previously filed on Sep. 11, 2017 (Six (6) pages).

* cited by examiner

MOUNTING POSITION OF FRONT SURFACE

MOUNTING POSITION OF REAR SURFACE

MOUNTING POSITION OF FRONT SURFACE

MOUNTING POSITION OF REAR SURFACE

THIRD LAYER OF FIRST CONTROL CIRCUIT

THIRD LAYER OF SECOND CONTROL CIRCUIT

DRIVE CONTROL UNIT FOR MOTOR

TECHNICAL FIELD

The present invention relates to a drive control unit for a motor, and specifically, to a drive control unit for a motor, in which a drive control system for the motor is made redundant, which is configured by accommodating in a housing an inverter substrate on which an inverter circuit for driving the motor is formed, and a control substrate on which a control circuit for controlling the inverter circuit is formed.

BACKGROUND ART

As a drive control unit for a motor, for example, in a case of being applied to an electric power steering that generates a steering assist force using a motor as a drive source, in order to maintain a function of the electric power steering even at the time of abnormality from the viewpoint of automatic operation of a vehicle and functional safety, there has been known a configuration in which two drive control systems for the motor are made redundant so that motors having two coil sets can be individually driven and controlled for each coil set (for example, refer to Patent Document 1). In such a drive control unit for a motor, an inverter substrate provided with two inverter circuits and a control substrate having two control systems for individually controlling the inverter circuits are accommodated in a housing in a state of being opposed to each other.

REFERENCE DOCUMENT LIST

Patent Document

Patent Document 1: JP 2011-176998 A

SUMMARY OF THE INVENTION

Problems to be Solved by the Invention

Additionally, in an inverter substrate of a power system, since it is possible to improve a mounting density by modularizing semiconductor switches configuring the inverter circuit, even when the drive control system for a motor is made redundant, it is relatively easy to suppress an increase in area of the inverter substrate.

However, in a control substrate of a signal system, in addition to the control of the inverter circuit, various kinds of control are conceivable depending on an application target of a drive control unit, and thus a range of possible modularization tends to be narrower as compared with the inverter substrate. Therefore, in the control substrate, when the drive control system for a motor is made redundant, the number of mounted components and a wiring pattern area increase substantially proportionally, so that it is relatively difficult to suppress the increase in area of the control substrate. When the area of the control substrate increases, the size of the drive control unit becomes large, so that there is a concern of affecting a degree of freedom of an in-vehicle layout.

The invention has been made in view of the above problems, and it is an object to provide a drive control unit for a motor that suppresses an increase in area of a control substrate due to redundancy of a drive control system for a motor.

Means for Solving the Problems

Therefore, on the premise that a motor having two coil sets on a stator is individually driven and controlled for each coil set, a drive control unit for the motor according to the invention includes an inverter substrate on which a first inverter circuit that drives each coil of a first coil set, and a second inverter circuit that drives each coil of a second coil set are formed; a control substrate on which a first control circuit that includes a first controller which controls the first inverter circuit, and a second control circuit that includes a second controller which controls the second inverter circuit are formed; and a housing in which the inverter substrate and the control substrate are arranged in parallel to each other, in which the first control circuit is positioned on one of a front surface side and a rear surface side of the control substrate, and the second control circuit is positioned on the other side.

Effects of the Invention

According to the drive control unit for a motor of the invention, it is possible to suppress an increase in the area of the control substrate due to redundancy of the drive control system for a motor.

BRIEF DESCRIPTION OF THE DRAWINGS

FIGS. 6A and 6B are plan views schematically illustrating mounting positions of electronic components on the control substrate, in which FIG. 6A illustrates the mounting position on a front surface, and FIG. 6B illustrates the mounting position on a rear surface viewed through the front surface.

FIGS. 7A and 7B are plan views schematically illustrating other examples of the mounting positions of the electronic components in FIGS. 6A and 6B, in which FIG. 7A illustrates the mounting position on the front surface, and FIG. 7B illustrates the mounting position on the rear surface viewed through the front surface.

FIGS. 8A and 8B are plan views schematically illustrating conductive patterns on the control substrate viewed through the front surface, in which FIG. 8A illustrates a conductive pattern on a third layer of a first control circuit, and FIG. 8B illustrates a conductive pattern on a third layer of a second control circuit.

MODE FOR CARRYING OUT THE INVENTION

Hereinafter, embodiment of the invention will be described in detail with reference to accompanying drawings.

Figure 1:
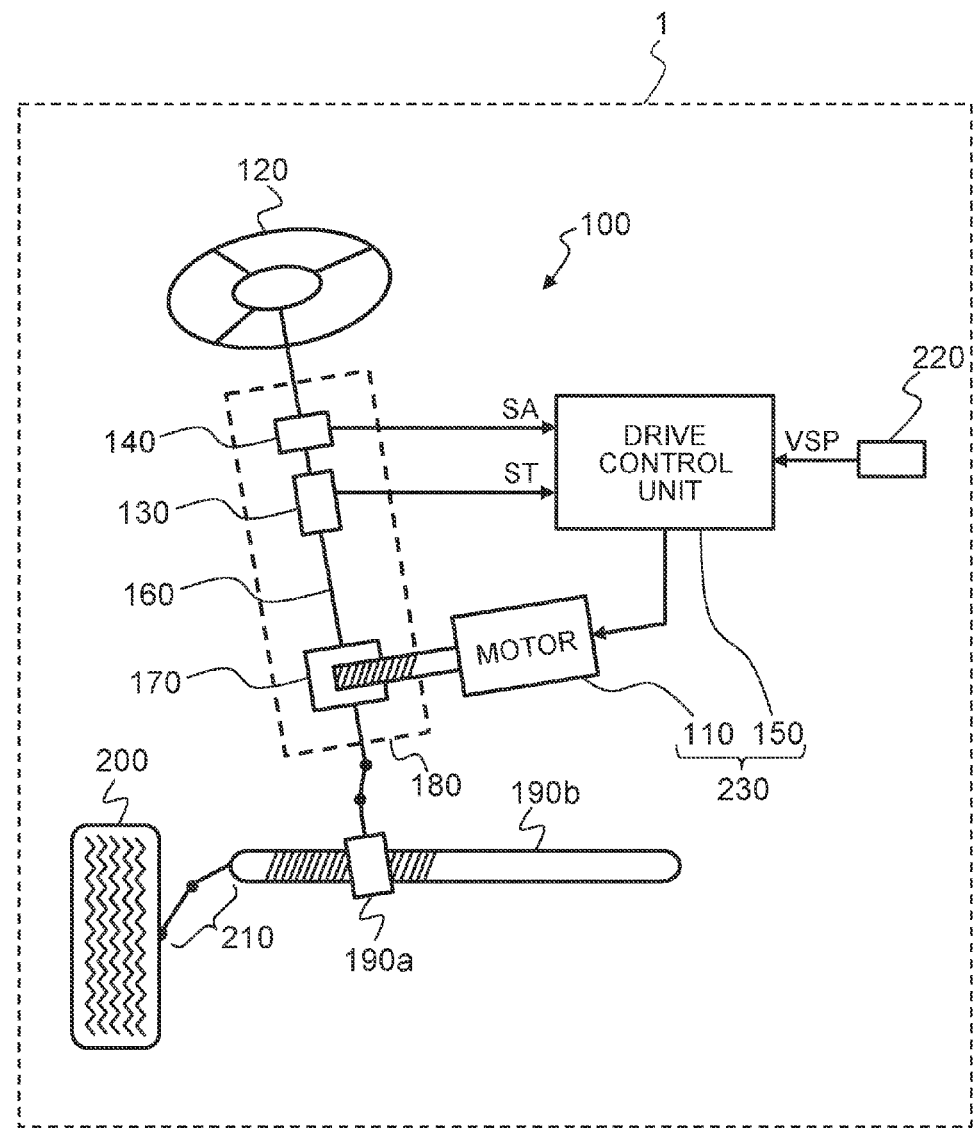
FIG. 1 is a schematic diagram illustrating an example of an electric power steering system.

FIG. 1 illustrates an embodiment of a drive control unit for a motor according to the invention, and illustrates an example applied to a drive control system for a motor that generates a steering assist force in an electric power steering system for a vehicle.

An electric power steering system 100 is provided in a vehicle 1, in which a motor 110 generates the steering assist force.

Electric power steering system 100 includes motor 110, a steering wheel 120, a steering torque sensor 130, a steering angle sensor 140, a drive control unit 150 including an inverter, and a decelerator 170 that decelerates a rotation of motor 110 and transmits the rotation to a steering shaft 160 (pinion shaft).

Steering torque sensor 130, steering angle sensor 140, and decelerator 170 are provided in a steering column 180 containing steering shaft 160.

A pinion gear 190*a* is provided at the tip of steering shaft 160. When pinion gear 190*a* rotates, a rack gear 190*b* horizontally moves in the lateral direction with respect to the traveling direction of vehicle 1. Steering mechanisms 210 for wheels 200 are respectively provided at both ends of rack gear 190*b*, and an orientation of wheels 200 is able to be changed by horizontal movement of rack gear 190*b*.

Steering torque sensor 130 detects a steering torque generated on steering shaft 160 as a driver of vehicle 1 performs a steering operation, and outputs a detection signal ST of the detected steering torque to drive control unit 150.

Steering angle sensor 140 detects a rotation angle of steering shaft 160 as a steering angle when steering wheel 120 is rotated by the driver of vehicle 1 performing the steering operation, and outputs detection signal SA of the detected steering angle to drive control unit 150.

Information on the state quantity such as steering torque signal ST, steering angle signal SA, and a vehicle speed signal VSP output from a vehicle speed sensor 220 used for determining the steering assist force is input to drive control unit 150 including a microcomputer (arithmetic processing unit).

Drive control unit 150 controls the steering assist force in electric power steering system 100 by controlling generated torque of motor 110 based on the operating state of vehicle 1 such as steering torque signal ST, steering angle signal SA, and vehicle speed signal VSP. In the embodiment, drive control unit 150 is integrally assembled with motor 110 to configure an electric unit 230.

Figure 2:
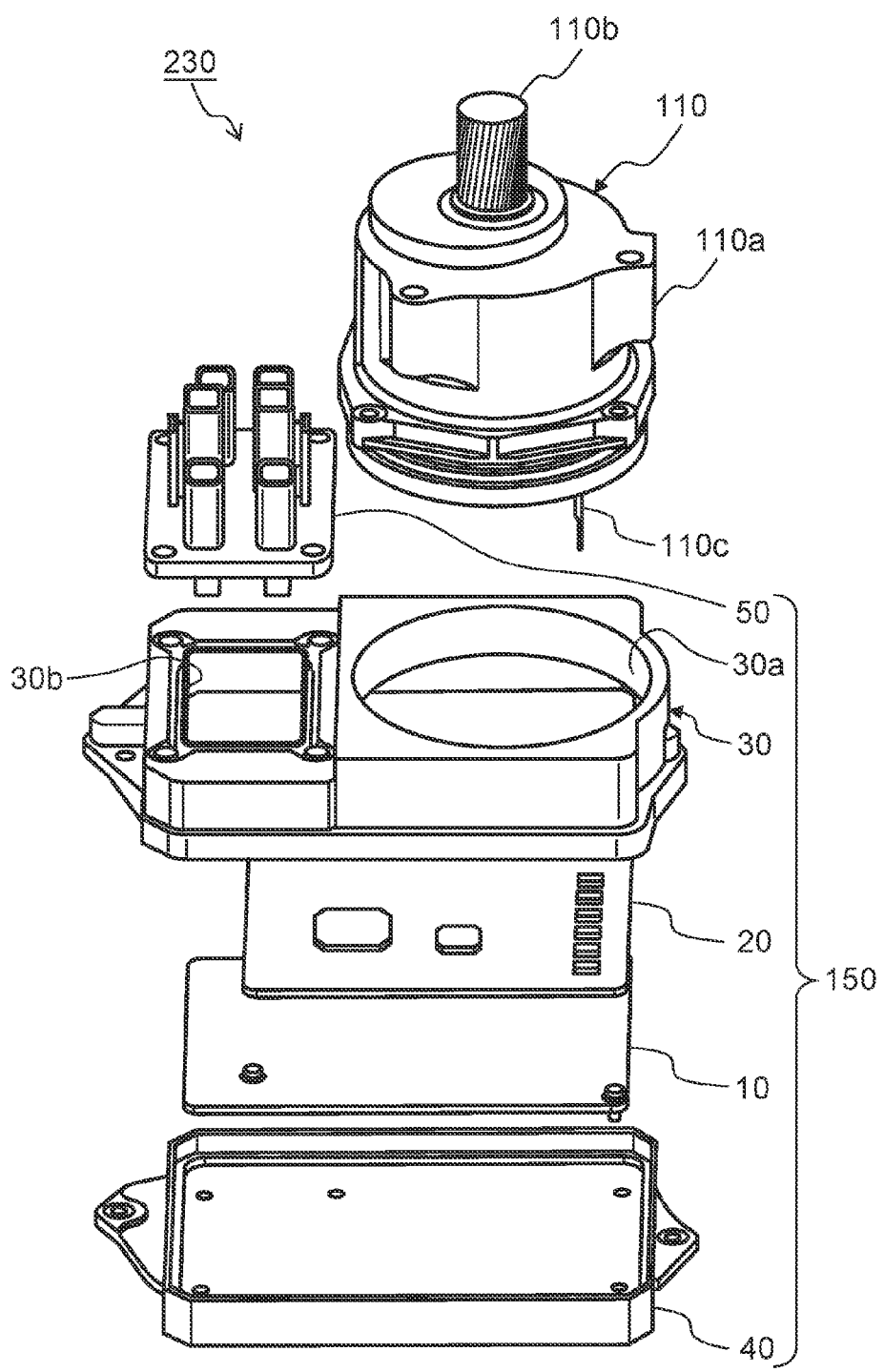
FIG. 2 is an exploded perspective view illustrating an example of an electric unit.

FIG. 2 illustrates an exploded perspective view of electric unit 230.

Motor 110 of electric unit 230 includes a motor housing 110*a* which fixes a stator (not illustrated) inside and rotatably holds a rotor (permanent magnet rotor) described later in a space formed at the center portion of the stator, a shaft 110*b* which is fixed to the rotor and transmits the rotational force to decelerator 170, and a motor terminal 110*c* which electrically connects drive control unit 150 and a three-phase coil wound around the stator described later. Shaft 110*b* is formed as a worm shaft that meshes with a worm wheel of decelerator 170.

Drive control unit 150 of electric unit 230 includes an inverter substrate 10 on which an inverter circuit for driving motor 110 is formed, a control substrate 20 on which a control circuit for controlling the inverter circuit is formed, a case 30 formed into a box shape, a cover 40 formed so as to be joinable to case 30 and sealing an opening of case 30 liquid-tightly by joining, and an electric connector 50 for supplying power from an external power source to each part of drive control unit 150, and for receiving various signals.

Case 30 and cover 40 configure a housing having an interior space by joining each other.

Opening portions 30*a* and 30*b* into which motor 110 and electric connector 50 are fitted tightly, respectively are further formed at the bottom of case 30. Among these, one end portion in the axial direction of motor 110 is fitted into opening portion 30*a* and fixed facing the internal space of the housing defined by case 30 and cover 40. A motor terminal 110*c* of motor 110 is directly connected to the inverter circuit of inverter substrate 10 via opening portion 30*a*.

In addition, in the inner space of the housing defined by case 30 and cover 40, in a state where control substrate 20 is positioned facing the one end portion of motor 110, and inverter substrate 10 is positioned facing control substrate 20 on the side opposite to the side of the one end portion of motor 110, case 30 and cover 40 are configured to accommodate and fix control substrate 20 and inverter substrate 10. As a result, control substrate 20 and inverter substrate 10 are arranged in parallel to each other inside the housing defined by case 30 and cover 40. Motor terminal 110*c* may be connected to the inverter circuit of inverter substrate 10 penetrating through control substrate 20.

For control substrate 20, for example, a printed board capable of surface-mounting electronic components such as a glass epoxy substrate is used, whereas inverter substrate 10 is not particularly limited, but a metal substrate may be used in consideration of heat dissipation of heat generated in the inverter circuit.

In the embodiment, motor 110 and drive control unit 150 are integrally assembled to configure electric unit 230, but in other embodiments, motor 110 and drive control unit 150 may be configured as separate units from each other at separate positions. In such an embodiment, opening portion 30*a* is not formed in case 30 of drive control unit 150, and motor terminal 110*c* is electrically connected to the inverter circuit in drive control unit 150 via electric connector 50.

Figure 3:
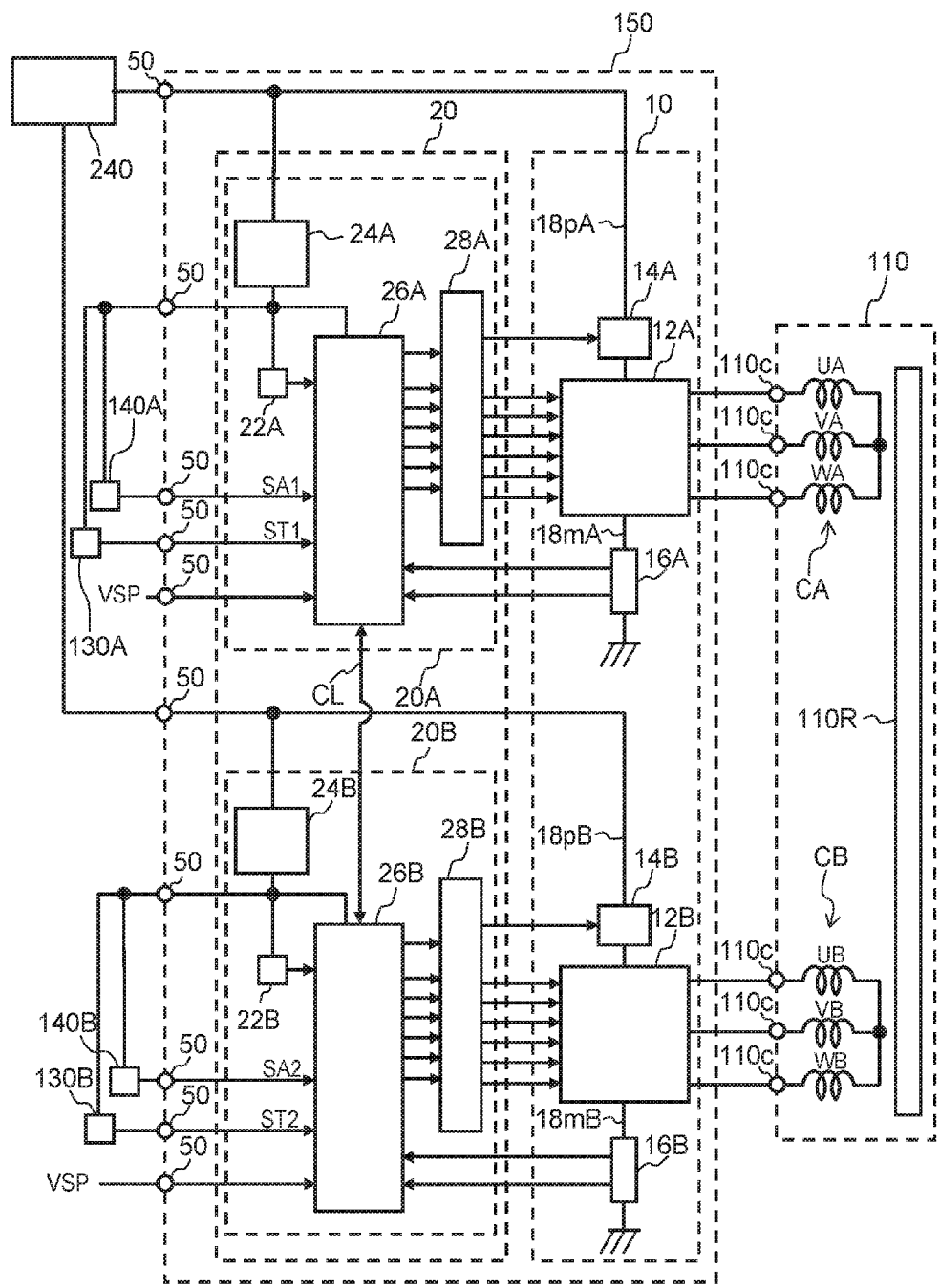
FIG. 3 is a circuit block diagram illustrating an example of a circuit configuration of a drive control unit and a motor.

FIG. 3 illustrates an example of a circuit configuration of a motor 110 and a drive control unit 150.

Motor 110 is a three-phase synchronous motor having a first coil set CA including three phase coils UA, VA, and WA to be star-connected and a second coil set CB including three phase coils UB, VB, and WB to be similarly star-connected. The points where three phase coils UA, VA, and WA are connected in first coil set CA and the points where three phase coils UB, VB, and WB are connected in second coil set CB are neutral points, respectively. First coil set CA and second coil set CB are provided in a mutually insulated state in a stator (not illustrated), and first coil set CA and second coil set CB share a magnetic circuit. In addition, as described above, one rotor 110R is rotatably provided in the central portion of the stator.

Drive control unit 150 has two drive control systems of motor 110 to make motor 110 redundant in order to maintain the function of the electric power steering even when an abnormality occurs in response to a request such as automatic operation or functional safety of vehicle 1. Drive control unit 150 includes a first drive control system that drives and controls each coil UA, VA, and WA of first coil set CA and a second drive control system that drives and controls each coil UB, VB, and WB of second coil set CB. Steering torque sensor 130 and steering angle sensor 140 connected to drive control unit 150 are different between the first drive control system and the second drive control system, and a steering torque sensor 130A and a steering angle sensor 140A are connected to the first drive control system and a steering torque sensor 130B and a steering angle sensor 140B are connected to the second drive control system. In addition, power supply from a power supply battery 240 is divided for each drive control system by electric connector 50. However, a vehicle speed sensor 220 that outputs a vehicle speed signal VSP to drive control unit 150 may be shared by the first drive control system and the second drive control system.

In drive control unit 150, inverter substrate 10 is accommodated as described above, and the inverter circuit formed on inverter substrate 10 includes a first inverter circuit 12A of the first drive control system and a second inverter circuit 12B of the second drive control system. In addition, inverter substrate 10 is provided with a power supply relay 14A and a power supply relay 14B, and a current sensor 16A and a current sensor 16B, in addition to first inverter circuit 12A and second inverter circuit 12B.

First inverter circuit 12A is connected to first coil set CA (three phase coils UA, VA, and WA) via motor terminal 110c, converts the DC power from a power supply battery 240, and supplies AC power to three phase coils UA, VA, and WA, respectively. In addition, second inverter circuit 12B is connected to second coil set CB (three phase coils UB, VB, and WB) via motor terminal 110c, converts the DC power from a power supply battery 240, and supplies AC power to three phase coils UB, VB, and WB, respectively.

First inverter circuit 12A includes a three-phase bridge circuit having three sets of semiconductor switches for respectively driving U-phase coil UA, V-phase coil VA, and W-phase coil WA of first coil set CA. In addition, second inverter circuit 12B includes a three-phase bridge circuit having three sets of semiconductor switches for respectively driving U-phase coil UB, V-phase coil VB, and W-phase coil WB of second coil set CB. The semiconductor switch is an electronic component using a semiconductor capable of switching operation to be turned on and off according to an external control signal, such as a field effect transistor (FET), an insulated gate bipolar transistor (IGBT), or a bipolar transistor.

Motor 110 is adapted to be normally driven by the total output of the two inverter circuits of first inverter circuit 12A and second inverter circuit 12B. As a result, motor 110 is adapted to generate torque according to the steering assist force required in electric power steering system 100. The output ratio of first inverter circuit 12A and second inverter circuit 12B is set to 50% versus 50% in the normal state, for example.

Power supply relay 14A is provided between power supply battery 240 and first inverter circuit 12A, and is configured to cut off power supply to first inverter circuit 12A in a predetermined case. In addition, power supply relay 14B is provided between power supply battery 240 and second inverter circuit 12B, and is configured to cut off power supply to second inverter circuit 12B in a predetermined case. Similar to the semiconductor switches of first inverter circuit 12A and second inverter circuit 12B, power supply relays 14A and 14B are electronic components using semiconductors capable of switching operation to be turned on and off according to an external control signal.

Current sensor 16A is a current detector that includes a shunt resistor interposed into, for example, a ground side bus 18 mA, of a positive side bus 18 pA connecting power supply battery 240 and first inverter circuit 12A to each other and ground side bus 18 mA connecting first inverter circuit 12A and the ground to each other, and that is capable of detecting a potential difference between both ends of the shunt resistor, and thus an energization state of first inverter circuit 12A is detected. In addition, current sensor 16B is a current detector that includes a shunt resistor interposed into, for example, a ground side bus 18 mB, of a positive side bus 18 pB and ground side bus 18 mB, and that is capable of detecting a potential difference between both ends of the shunt resistor, and thus an energization state of second inverter circuit 12B is detected.

As described above, control substrate 20 is accommodated in drive control unit 150 so as to be opposed to inverter substrate 10, and the control circuit formed on control substrate 20 has a first control circuit 20A of the first drive control system and a second control circuit 20B of the second drive control system. First control circuit 20A has a magnetic pole position sensor 22A, a power supply integrated circuit (IC) 24A, a microcomputer (first controller) 26A, and a pre-driver (first pre-driver) 28A. In addition, second control circuit 20B has a magnetic pole position sensor 22B, a power supply IC 24B, a microcomputer (second controller) 26B, and a pre-driver (second pre-driver) 28B. Since the configuration of second control circuit 20B executes the same function as the configuration of first control circuit 20A, hereinafter, redundant description will be omitted.

Magnetic pole position sensor 22A is a position detector that detects the magnetic pole position of rotor 110R. Magnetic pole position sensor 22A outputs a magnetic pole position detection signal corresponding to the magnetic pole position of rotating rotor 110R to microcomputer 26A. In the embodiment, for example, magnetic pole position sensor 22A is a magnetoresistive element mounted on control substrate 20 in the vicinity of the one end portion (rotor 110R) of motor 110, but the invention is not limited thereto, and magnetic pole position sensor 22A may be a Hall element, a Hall IC or the like mounted on control substrate 20, or a resolver connected to shaft 110b of motor 110, or the like. In a case where magnetic pole position sensor 22A is not mounted on control substrate 20 (for example, in a case where a resolver or the like is used), the positional relationship between control substrate 20 and inverter substrate 10 with respect to motor 110 may be exchanged.

Power supply IC 24A receives power supply from power supply battery 240 via electric connector 50, and has a function of adjusting the power supply voltage of power supply battery 240 to the operating voltage of microcomputer 26A and magnetic pole position sensor 22A to supply the operating voltage. In addition, power supply IC 24A also supplies power to steering torque sensor 130A and steering angle sensor 140A disposed outside drive control unit 150 via electric connector 50.

Microcomputer 26A includes a central processing unit (CPU), a random access memory (RAM), a read only memory (ROM), an input and output interface, a communication interface and the like, and is configured to execute the following functions by executing a program stored in a ROM or the like.

That is, microcomputer 26A computes the steering assist force required in electric power steering system 100 based on steering torque detection signal ST, steering angle detection signal SA, and vehicle speed signal VSP input via electric connector 50, and calculates a target current value which is the target output value of the total output of first inverter circuit 12A and second inverter circuit 12B so that torque of motor 110 is able to be generated according to the calculated steering assist force. Microcomputer 26A reads the output ratio in the normal state of first inverter circuit 12A and second inverter circuit 12B from a memory such as a ROM, and corrects the target current value according to the output ratio to obtain the corrected target current value that is a target output value in each inverter circuit of first inverter circuit 12A and second inverter circuit 12B. For example, in a case where the output ratio in the normal state is set to 50% versus 50%, microcomputer 26A corrects the target current value to a half value and sets the half value as the corrected target current value that is a target output value of first inverter circuit 12A. Computing of the target current value or the target current value and the corrected target current value is performed by any one of microcomputer 26A or microcomputer 26B, and the calculated target current value or the calculated target current value and the corrected target current value may be transmitted to the other microcomputer via a communication line to be described later.

In addition, microcomputer 26A is electrically connected to both ends of the shunt resistor of current sensor 16A, and calculates an actual current value which is the value of the current actually flowing to negative electrode bus 18 mA of first inverter circuit 12A, based on a potential difference between both ends. Microcomputer 26A calculates a duty ratio which is a ratio of the time during which the semiconductor switch of first inverter circuit 12A is turned on and off by a PWM operation, based on the deviation between the corrected target current value and the actual current value. Furthermore, microcomputer 26A calculates the magnetic pole position of rotor 110R from the magnetic pole position detection signal. Microcomputer 26A outputs a PWM control signal according to the magnetic pole position and the duty ratio.

Pre-driver 28A is a circuit for driving a semiconductor switch configuring a three-phase bridge circuit of first inverter circuit 12A in accordance with a command signal (PWM control signal) from microcomputer 26A.

In this manner, in drive control unit 150, the first drive control system includes first inverter circuit 12A for driving respective coils UA, VA, and WA of first coil set CA, and first control circuit 20A for controlling first inverter circuit 12A. The second drive control system includes second inverter circuit 12B for driving respective coils UB, VB, and WB of second coil set CB, and second control circuit 20B for controlling second inverter circuit 12B.

Microcomputer 26A has various known abnormality diagnosis functions for diagnosing whether an abnormality has occurred in the first drive control system or not, such as diagnosing that over current is generated when a peak value of the actual current value detected by current sensor 16A continues for a predetermined time. Microcomputer 26B also has a similar abnormality diagnosis function.

For example, in a case where microcomputer 26A diagnoses that an abnormality has occurred in the first drive control system, power supply relay 14A is immediately turned off via pre-driver 28A to cut off the power supply from power supply battery 240 to first inverter circuit 12A and stop the inverter output to first coil set CA. At this time, microcomputer 26A may stop various kinds of computing processing such as computing of the target current value and actual current value.

In addition, a communication line CL is provided between microcomputer 26A and microcomputer 26B, and in a case where microcomputer 26A diagnoses that an abnormality has occurred in the first drive control system, microcomputer 26A immediately outputs status information indicating that the abnormality has occurred in the first drive control system to microcomputer 26B via communication line CL. In addition to the transmission of the status information, communication line CL can also be used for other communication applications such as mutual monitoring of both CPUs of microcomputer 26A and microcomputer 26B, and data transmission and reception of the target current value or the target current value and the corrected target current value.

When microcomputer 26B corrects the target current value, based on the status information received from microcomputer 26A, microcomputer 26B switches the inverter output ratio read from the memory such as the ROM from the output ratio in the normal state (for example, 50% versus 50%) to the output ratio in the abnormal state (for example, 0% versus 100%). In the case where the output ratio in the abnormal state is set to 0% versus 100%, microcomputer 26B does not correct the target current value and sets the target current value as the target output value of second inverter circuit 12B.

In a case where microcomputer 26B diagnoses that an abnormality occurs in the second drive control system, the processing in the abnormal state in microcomputer 26A and microcomputer 26B is reversed.

Figure 4:
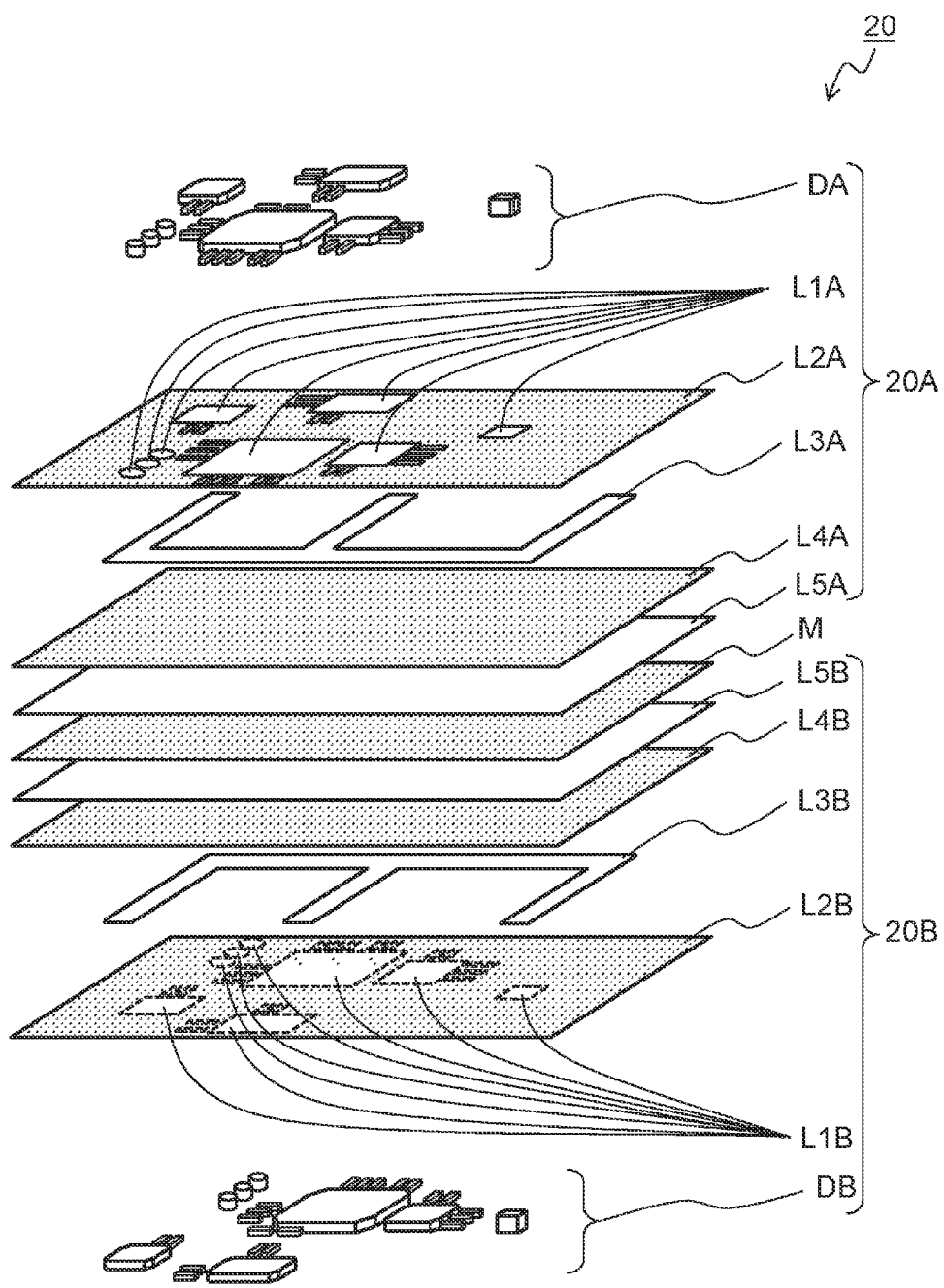
FIG. 4 is a developed perspective view schematically illustrating a multilayer structure of a control substrate.

FIG. 4 is a developed perspective view schematically illustrating a multilayer structure of a control substrate 20.

Control substrate 20 is configured such that first control circuit 20A is positioned on the front surface side and second control circuit 20B is positioned on the rear surface side. First control circuit 20A has electronic components mounted on the front surface of control substrate 20, and includes a plurality of layers laminated inward from the front surface. In addition, second control circuit 20B has electronic components mounted on the rear surface of control substrate 20, and includes a plurality of layers laminated inward from the rear surface. First control circuit 20A and second control circuit 20B are electrically insulated by an intermediate insulating layer M except for a portion. In this manner, control substrate 20 forms a multilayer substrate in which the plurality of layers are laminated.

First control circuit 20A forms a first control circuit layer in which a first layer L1A, a second layer L2A, a third layer L3A, a fourth layer L4A, and a fifth layer L5A are laminated in order, inward from the front surface on which electronic components DA are mounted.

In addition, second control circuit 20B forms a second control circuit layer in which a first layer L1B, a second layer L2B, a third layer L3B, a fourth layer L4B, and a fifth layer L5B are laminated in order, inward from the rear surface on which electronic components DB are mounted. Since each layer of the second control circuit layer and each layer of the first control circuit layer are the same as long as the layers have the same lamination order, hereinafter, redundant description of the second control circuit layer will be omitted.

First layer L1A, third layer L3A, and fifth layer L5A are conductive layers formed of a conductor such as a copper foil. Second layer L2A and fourth layer L4A are thin plate-shaped or sheet-shaped insulating layers formed mainly of an insulating resin (for example, epoxy resin), and electrically insulate between first layer L1A and third layer L3A and between third layer L3A and fifth layer L5A, respectively.

First layer L1A is a mounting pad for surface-mounting electronic component DA, third layer L3A is a conductive pattern configuring a wiring circuit in first control circuit 20A, and the fifth layer L5A is a ground layer spreading over the entire region in the planar direction of control substrate 20. In the embodiment, it is assumed that not only third layer L3A but also the mounting pad of first layer L1A is included in the conductive pattern.

Figure 5:
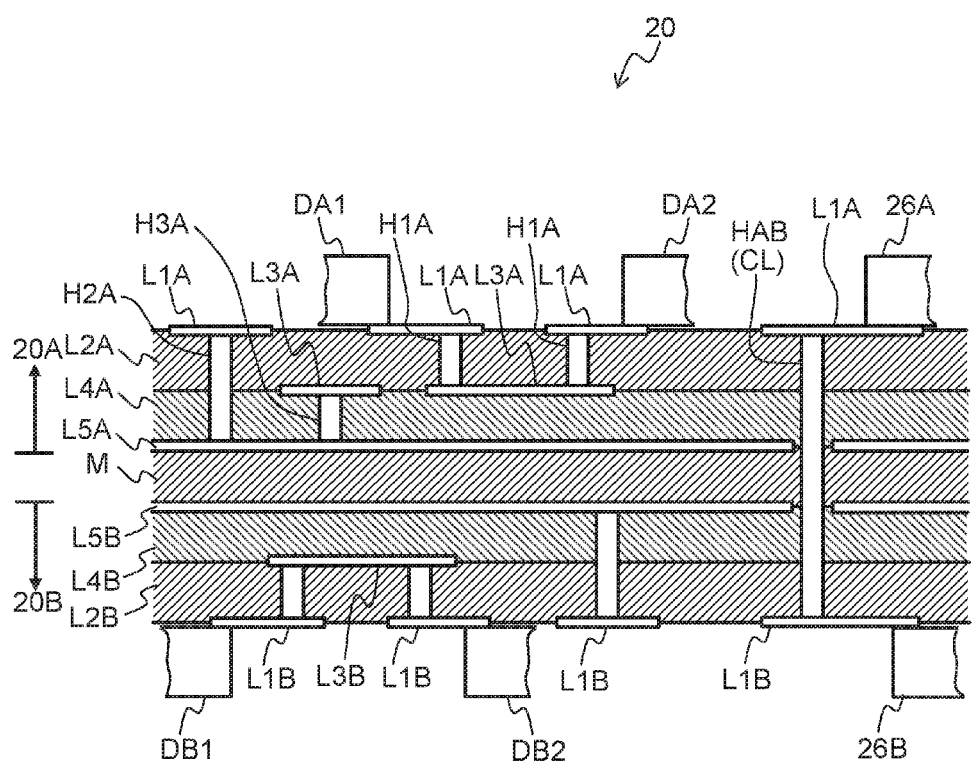
FIG. 5 is a cross-sectional view schematically illustrating a three-dimensional wiring structure of the control substrate.

FIG. 5 is a cross-sectional view illustrating a three-dimensional wiring structure of control substrate 20.

As illustrated in FIG. 5, the mounting pad of first layer L1A and the conductive pattern of third layer L3A are electrically connected by an interlayer conductive path H1A formed by, for example, filling and solidifying a conductive paste in a blind via hole penetrating through second layer L2A in the thickness direction of control substrate 20, and one electronic component DA1 is electrically connected to another electronic component DA2 via first layer L1A, third layer L3A, and interlayer conductive path H1A. In addition, fifth layer L5A is able to be electrically connected to first layer L1A by interlayer conductive path H2A which is formed between a portion of first layer L1A and fifth layer L5A, or to third layer L3A by interlayer conductive path H3A which is formed between a portion of third layer L3A and fifth layer L5A. In this manner, first control circuit 20A is three-dimensionally configured on the front surface side of control substrate 20.

Here, as illustrated in FIG. 3, microcomputer 26A of first control circuit 20A and microcomputer 26B of second control circuit 20B are electrically connected by communication line CL, and as illustrated in FIG. 5, communication line CL includes an interlayer conductive path HAB penetrating through control substrate 20 including insulating layer M from first layer L1A of first control circuit 20A to first layer L1B of second control circuit 20B. At this time, in order to prevent a short circuit between interlayer conductive path HAB, fifth layer L5A which is the ground layer of first control circuit 20A, and fifth layer L5B which is the ground layer of second control circuit 20B, a portion of the ground layer through which interlayer conductive path HAB penetrates and the periphery thereof are cut out. In addition, interlayer conductive path HAB is configured not to come into contact with the conductive patterns of third layers L3A and L3B and the mounting pads on which microcomputer 26A and microcomputer 26B are not surface-mounted among first layers L1A and L1B. As a result, regarding the electrical relationship between first control circuit 20A and second control circuit 20B in control substrate 20, microcomputer 26A and microcomputer 26B are connected only at interlayer conductive path HAB so that even in a case where an abnormality occurs in one of first control circuit 20A and second control circuit 20B, it is possible to minimize the spread of the influence on the other circuit.

Figure 6A:
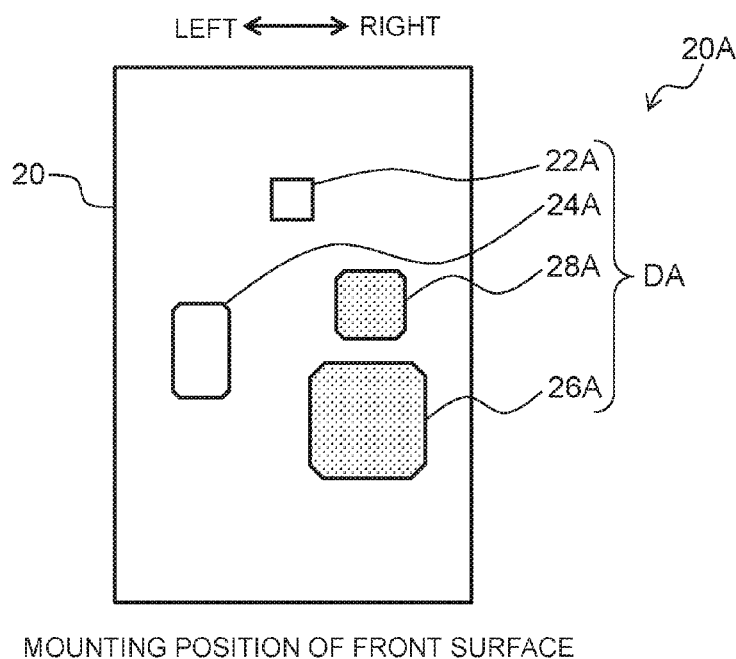
Figure 6B:
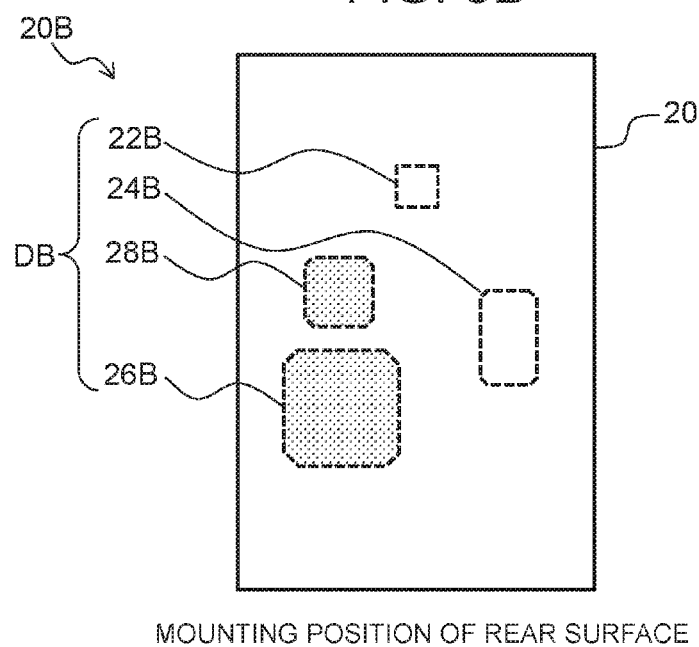

FIGS. 6A and 6B are plan views schematically illustrating mounting positions of electronic components DA and DB on control substrate 20. For convenience of the description, it is assumed that control substrate 20 is formed in a rectangular shape, and the opposing direction of a pair of opposing sides when control substrate 20 is viewed from the front surface side in a plan view is the left and right direction as illustrated in the figure.

As illustrated in FIG. 6A, regarding the mounting position of electronic component DA (representing magnetic pole position sensor 22A, power supply IC 24A, microcomputer 26A, and pre-driver 28A as a representative example) of first control circuit 20A, which is mounted on the front surface of control substrate 20, heat generating components such as microcomputer 26A and pre-driver 28A (indicated by hatching) are unevenly distributed to the right side, and power supply IC 24A which is not the heat generating component is unevenly distributed to the left side as viewed from the front surface side of control substrate 20.

As illustrated in FIG. 6B, the mounting position of electronic component DB (representing microcomputer 26B, pre-driver 28B, magnetic pole position sensor 22B, and power supply IC 24B as a representative example) of second control circuit 20B, which is mounted on the rear surface of control substrate 20 is bilaterally symmetrical with respect to the mounting position of electronic component DA of first control circuit 20A, so that heat generating components such as microcomputer 26B and pre-driver 28B (indicated by hatching) are unevenly distributed to the left side, and power supply IC 24B which is not the heat generating component is unevenly distributed to the right side as viewed through the front surface side of control substrate 20.

In this manner, the mounting pad of first layer L1A in first control circuit 20A and the mounting pad of first layer L1B in second control circuit 20B are formed so that the mounting position of electronic component DB of second control circuit 20B is bilaterally symmetrical with respect to the mounting position of electronic component DA of first control circuit 20A, in which the heat generating components are unevenly distributed to the right side in a plan view of control substrate 20. Therefore, the mounting pad of first layer L1A viewed from the front surface side of control substrate 20 and the mounting pad of first layer L1B viewed from the rear surface side of control substrate 20 have the same shape.

The mounting pads of first layers L1A and L1B are formed so that the mounting positions of electronic components DA and DB are as illustrated in FIGS. 6A and 6B. Therefore, the heat generating component of first control circuit 20A and the heat generating component of second control circuit 20B are surface-mounted without overlapping in the plan view of control substrate 20. Specifically, in a normal state where no abnormality occurs in the first drive control system and the second drive control system, in a case where both of first control circuit 20A and second control circuit 20B are operating, the influence of mutual heat generation between the heat generating component of first control circuit 20A and the heat generating component of second control circuit 20B is reduced, so that the temperature rise of the heat generating component is suppressed.

In addition, the mounting pads of first layers L1A and L1B are formed so that the mounting positions of electronic components DA and DB are as illustrated in FIGS. 6A and 6B. Therefore, first control circuit 20A and second control circuit 20B have the same shape for the mounting pads so as to suppress a decrease of design efficiency and manufacturing efficiency.

In a case where one control circuit has a plurality of heat generating components, such as first control circuit 20A having microcomputer 26A and pre-driver 28A, instead of the mounting position of FIG. 6A in which heat generating components are unevenly distributed to one side of the left and right sides of control substrate 20, the mounting position may be as below.

Figure 7A:
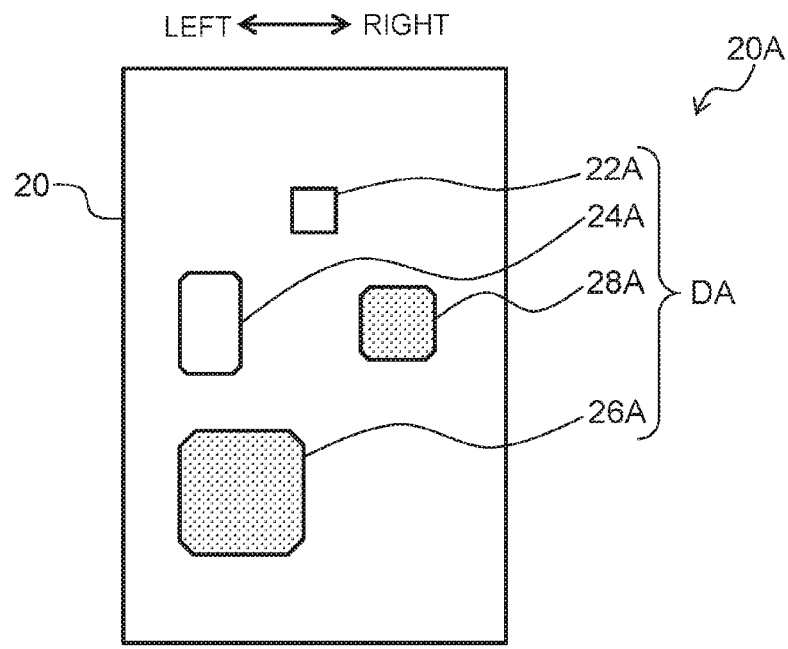
Figure 7B:
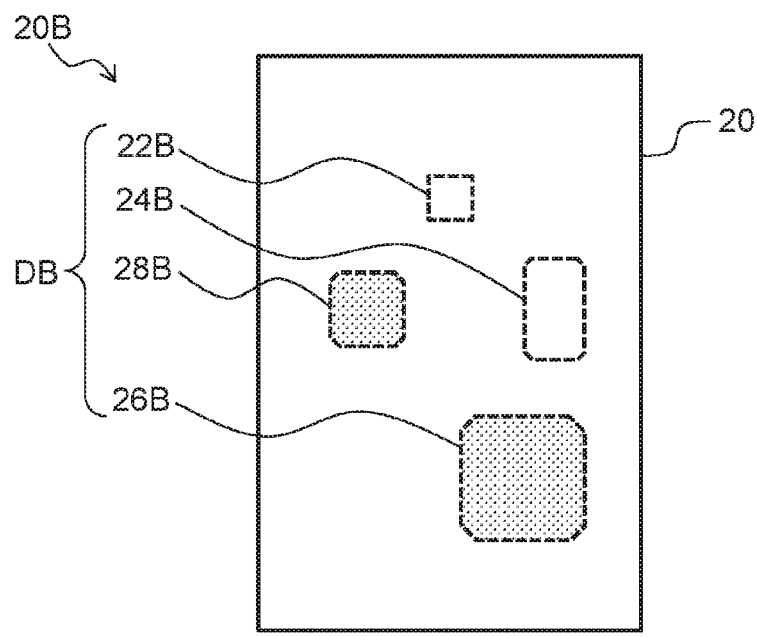

That is, as illustrated in FIG. 7A, regarding the mounting position of electronic component DA of first control circuit 20A mounted on the front surface of control substrate 20, microcomputer 26A is unevenly distributed to the left side and pre-driver 28A is unevenly distributed to the right side as viewed from the front surface side of control substrate 20, so that the plurality of the heat generating components (indicated by hatching) are unevenly distributed to the right and left sides, but are not arranged side by side in the lateral direction. As illustrated in FIG. 7B, the mounting position of electronic component DB of second control circuit 20B mounted on the rear surface of control substrate 20 is bilaterally symmetrical with respect to the mounting position of electronic component DA of first control circuit 20A so that microcomputer 26B is unevenly distributed to the right side and pre-driver 28B is unevenly distributed to the left side as viewed through the front surface side of control substrate 20. The mounting pads of first layer L1A and first layer L1B are formed so as to have such mounting positions. Therefore, it is possible to reduce the temperature rise of the heat generating component while suppressing the decrease of the design efficiency and the like.

In other words, the mounting pad of first layer L1A in first control circuit 20A and the mounting pad of first layer L1B in second control circuit 20B are formed such that the mounting positions of the electronic components surface-mounted on each of the mounting pads are line symmetrical in the plan view of control substrate 20, and the mounting positions of the heat generating components surface-mounted on each of the mounting pads are not overlapped in a plan view.

Figure 8A:
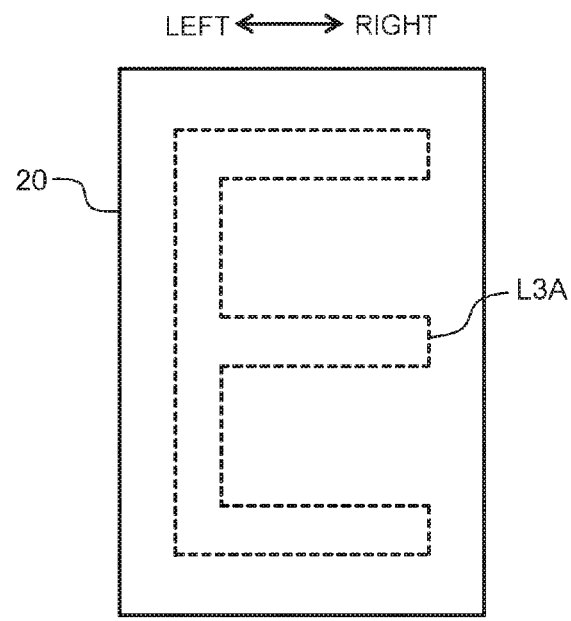
Figure 8B:
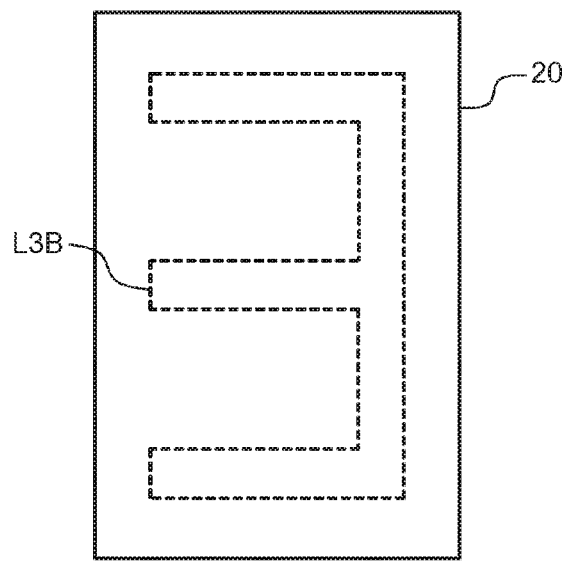

FIGS. 8A and 8B are plan views schematically illustrating conductive patterns of third layer L3A in first control circuit 20A and third layer L3B in second control circuit 20B.

As illustrated in FIGS. 6A and 6B and FIGS. 7A and 7B, since the mounting pads are formed such that the mounting position of electronic component DB of second control circuit 20B is bilaterally symmetrical with respect to the mounting position of electronic component DA of first control circuit 20A in a plan view, the conductive pattern of third layer L3B in second control circuit 20B is also formed bilaterally symmetrically with respect to the conductive pattern of third layer L3A in first control circuit 20A in the plan view of control substrate 20. Accordingly, the conductive pattern of third layer L3A viewed through the front surface side of control substrate 20 and the conductive pattern of third layer L3B viewed through the rear surface side of control substrate 20 have the same shape.

According to drive control unit 150 of motor 110, even when the drive control system of motor 110 is made two and redundant based on the request to electric power steering system 100 related to the automatic operation and the functional safety of vehicle 1, an increase in the substrate area of control substrate 20 is able to be suppressed, by forming first control substrate 20A on the front surface side of control substrate 20 and forming second control substrate 20B on the rear surface side of control substrate 20. Therefore, the size of drive control unit 150 is not increased, so that it is possible to ease restrictions on the flexibility of the in-vehicle layout.

In addition, according to drive control unit 150, even when first control circuit 20A and second control circuit 20B are respectively formed on both sides of control substrate 20, the heat generating components are mounted so as not to overlap in a plan view. Therefore, it is possible to reduce the thermal deterioration due to the temperature rise of the heat generating components, and to further improve the reliability of drive control unit 150 and electric power steering system 100 due to the redundancy of the drive control system of motor 110. Specifically, the mounting pads of first layer L1A and the conductive patterns of third layer L3A in first control circuit 20A and the mounting pads of first layer L1B and the conductive patterns of third layer L3B in second control circuit 20B are formed so as to be line symmetrical in the plan view of control substrate 20 and have the same shape. Therefore, it is possible to suppress a decrease in design efficiency and manufacturing efficiency as compared with a case of having different mounting pads and conductive patterns.

Furthermore, according to drive control unit 150, in control substrate 20, the electric connection between first control circuit 20A and second control circuit 20B is only interlayer conductive path HAB as communication line CL which communicates between microcomputer 26A and microcomputer 26B. Therefore, even in a case where an abnormality occurs in one of first control circuit 20A and second control circuit 20B, it is possible to reduce the influence on the other circuit as much as possible.

In the embodiment described above, the mounting pad of first layer L1A and the conductive pattern of third layer L3A in first control circuit 20A, and the mounting pad of first layer L1B and conductive pattern of third layer L3A in second control circuit 20B are formed so that the mounting positions of the electronic components surface-mounted on each of the mounting pads are line symmetrical in the plan view of control substrate 20 and the mounting positions of the heat generating components surface-mounted on each of the mounting pads are not overlapped in a plan view. However, instead of the line symmetrical configuration described above, the mounting pad and the conductive pattern configuring first control circuit 20A and the mounting pad and the conductive pattern configuring second control circuit 20B may be formed so as to be point symmetric in the plan view of control substrate 20. In this case, in first control circuit 20A located on the front surface side and second control circuit 20B located on the rear surface side of control substrate 20, the electrical connection to inverter substrate 10 and electric connector 50 can be easily made even when the positional relationship with respect to inverter substrate 10 and electric connector 50 is different.

In addition, in the embodiment described above, in a case where the design efficiency, the manufacturing efficiency and the like can be ignored, it is possible to form the mounting pad of first layer L1A and the conductive pattern of third layer L3A in first control circuit 20A, and the mounting pad of first layer L1B and the conductive pattern of third layer L3A in second control circuit 20B so that the mounting positions of the electronic components surface-mounted on each of the mounting pads are not formed to be line symmetrical in the plan view of control substrate 20, but merely the mounting positions of the heat generating components surface-mounted on each of the mounting pads do not overlap in a plan view.

In the embodiment described above, drive control unit 150 is configured to cut off the inverter output of the drive control system diagnosed as abnormal in the abnormal state so as to set the inverter output of the drive control system diagnosed as normal to 100%. Instead, drive control unit 150, for example, drive motor 110 with the output ratios of first inverter circuit 12A and second inverter circuit 12B as 100% versus 0% in the normal state, and cut off the output of first inverter circuit 12A so that the output of normal second inverter circuit 12B is 100% in the abnormal state of first inverter circuit 12A. Therefore, it is possible to operate only microcomputer 26B controlling second inverter circuit 12B. In this case, it is microcomputer 26B which starts to operate that generates heat after the abnormality is diagnosed, and microcomputer 26A in which operation has stopped does not generate heat.

Therefore, in a case where the temperature of microcomputer 26B does not exceed the allowable temperature even taking into consideration of the heat received from microcomputer 26A before being diagnosed as abnormal, the mounting pad of first layer L1A and the conductive pattern of third layer L3A in first control circuit 20A, and the mounting pad of first layer L1B and the conductive pattern of third layer L3A in second control circuit 20B may be formed such that the mounting positions of the heat generating components surface-mounted on each of the mounting pads overlap in a plan view.

In the embodiment described above, application target of drive control unit 150 is not limited to electric power steering system 100, and drive control unit 150 is applicable to anything as long as it drives and controls motor 110 having two coil sets CA and CB. For example, in a case where motor 110 having two coil sets CA and CB is used as the electric actuator of the electric brake system, drive control unit 150 having two drive control systems may be applied.

REFERENCE SYMBOL LIST

10 Inverter substrate
12A First inverter circuit

12B Second inverter circuit
20 Control substrate
20A First control circuit
20B Second control circuit
26A Microcomputer
26B Microcomputer
28A Pre-driver
28B Pre-driver
30 Case
40 Cover
110 Motor
150 Drive control unit
DA Electronic components
DB Electronic components
L1A Mounting pad
L1B Mounting pad
L3A Conductive pattern
L3B Conductive pattern
L5A Ground layer
L5B Ground layer
M Insulating layer
HAB (CL) Interlayer conductive path (communication line)
CA First coil set (UA, VA, WA)
CB Second coil set (UB, VB, WB)

The invention claimed is:

1. A drive control unit for a motor configured to individually drive and control the motor having two coil sets on a stator for each coil set, the unit comprising:
   an inverter substrate on which a first inverter circuit that drives each coil of a first coil set, and a second inverter circuit that drives each coil of a second coil set are formed;
   a control substrate on which a first control circuit that includes a first controller which controls the first inverter circuit, and a second control circuit that includes a second controller which controls the second inverter circuit are formed; and
   a housing in which the inverter substrate and the control substrate are arranged in parallel to each other,
   wherein the first control circuit is positioned on one of a front surface side and a rear surface side of the control substrate, and the second control circuit is positioned on the other side.

2. The drive control unit for a motor according to claim 1, wherein a heat generating component of the first control circuit positioned on the one surface side, and a heat generating component of the second control circuit positioned on the other surface side are surface-mounted so as not to overlap each other in a plan view.

3. The drive control unit for a motor according to claim 2, wherein the first control circuit and the second control circuit are formed with the same conductive patterns that are line symmetrical in a plan view.

4. The drive control unit for a motor according to claim 2, wherein the heat generating component of the first control circuit includes the first controller, and the heat generating component of the second control circuit includes the second controller.

5. The drive control unit for a motor according to claim 2, wherein, in a case where a first drive control system that includes the first inverter circuit and the first control circuit, and a second drive control system that includes the second inverter circuit and the second control circuit are normal, the first controller and the second controller are configured to cause both of the first inverter circuit and the second inverter circuit to output a current at a predetermined ratio.

6. The drive control unit for a motor according to claim 5, wherein the predetermined ratio is 50% versus 50%.

7. The drive control unit for a motor according to claim 1, wherein the control substrate is formed as a multilayer substrate obtained by laminating a plurality of layers including a first control circuit layer in which the first control circuit is formed, a second control circuit layer in which the second control circuit is formed, and an insulating layer which electrically insulates the first control circuit layer and the second control circuit layer, and
only a communication line that allows communication between the first controller which is surface-mounted on the first control circuit layer, and the second controller which is surface-mounted on the second control circuit layer is formed penetrating through the insulating layer.

8. The drive control unit for a motor according to claim 7, wherein the control substrate has ground layers that are laminated on both sides of the insulating layer.

9. The drive control unit for a motor according to claim 7, wherein, in a case where either one of a first drive control system that includes the first inverter circuit and the first control circuit, and a second drive control system that includes the second inverter circuit and the second control circuit is abnormal, status information indicating that an abnormality has occurred is transmitted via the communication line between the first controller and the second controller.

10. The drive control unit for a motor according to claim 1, wherein the inverter substrate and the control substrate are disposed to be opposed to each other in the housing.

11. The drive control unit for a motor according to claim 1, wherein the motor is fitted in the housing to form an integral unit.

12. The drive control unit for a motor according to claim 1, wherein, in a case where a first drive control system that includes the first inverter circuit and the first control circuit, and a second drive control system that includes the second inverter circuit and the second control circuit are normal, the first controller and the second controller are configured to cause any one of the first inverter circuit and the second inverter circuit to output a current, and
in a case where an abnormality occurs in the system that includes the one inverter circuit out of the first drive control system and the second drive control system, the first controller and the second controller are configured to cut off the output from the one inverter circuit and cause the other inverter circuit to output a current.

* * * * *